United States Patent [19]

Namba et al.

[11] Patent Number: 4,472,649
[45] Date of Patent: Sep. 18, 1984

[54] BRUSHLESS ROTARY MACHINE

[75] Inventors: Masanao Namba; Tsuneo Watanabe, both of Yokohama; Daisuke Hiramatsu, Tokyo; Kazuo Sato, Ebina, all of Japan

[73] Assignee: Tokyo Shibaura Denki Kabushiki Kaisha, Kawasaki, Japan

[21] Appl. No.: 458,842

[22] Filed: Jan. 18, 1983

[30] Foreign Application Priority Data

Jan. 29, 1982 [JP] Japan .................. 57-12851

[51] Int. Cl.³ ............................................ H02K 11/00
[52] U.S. Cl. ............................ 310/68 D; 310/60 A; 310/89; 310/112; 363/141
[58] Field of Search ............ 310/68 R, 60 R, 68 D, 310/60 A, 71, 58, 59, 165, 91, 61, 89, 112–114; 363/13, 141, 145, 144

[56] References Cited

U.S. PATENT DOCUMENTS

| 2,897,383 | 7/1959 | Barrows | 310/68 D |
| 3,354,330 | 11/1967 | Storsand | 310/68 R |
| 3,371,235 | 2/1968 | Hoover | 310/68 R |
| 3,457,440 | 7/1969 | Horsley | 310/68 R |
| 3,733,505 | 5/1973 | Kildishev | 310/68 D |
| 3,829,725 | 8/1974 | Petersen | 310/68 D |
| 3,858,069 | 12/1974 | Küter | 310/68 D |
| 4,155,019 | 5/1979 | Weghaupt | 310/71 |

FOREIGN PATENT DOCUMENTS

1553639  2/1968 France ............ 310/68 D

Primary Examiner—R. Skudy
Attorney, Agent, or Firm—Oblon, Fisher, Spivak, McClelland & Maier

[57] ABSTRACT

A brushless rotary machine such as a brushless motor or a brushless generator is provided with first and second shafts. A rotor is fixed to the first shaft and rotated with the rotation of the first shaft, and magnetized when the rotor is fed with DC current. AC generator is mounted to the second shaft and generates AC current with rotation of the second shaft. The first and second shafts are separated and coupled to each other by a coupling mechanism having a space between the first and second shafts. In the space is provided a rectifier which is electrically coupled with the AC generator and the rotor, rectifies AC current generated by the AC generator into DC current and supplies the DC current to the rotor, thereby to magnetize the rotor.

11 Claims, 12 Drawing Figures

BRUSHLESS ROTARY MACHINE

BACKGROUND OF THE INVENTION

The present invention relates to a brushless rotary machine with an AC exciter and a rotary rectifier and, more particularly, to a brushless rotary machine well adaptable for high speed operation.

Figure 1:
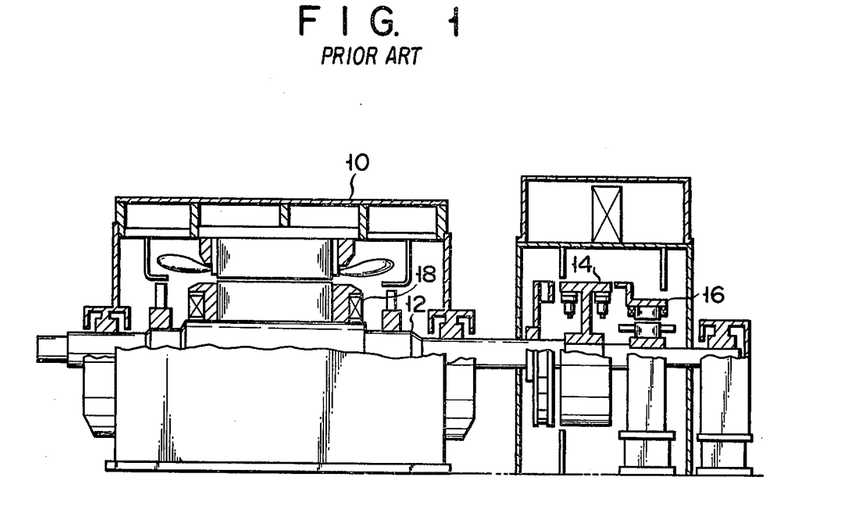
FIG. 1 is a longitudinal, sectional, cut-away view schematically showing a conventional brushless motor.

In recent years, there has been great need for brushless rotary machines because they are maintenance free. Brushless rotary machines have found increasing practical use in a variety of fields for the same reason. FIG. 1 shows a longitudinal sectional view of a structure of a conventional brushless rotary machine. In the figure, a rotating shaft 12 of a rotating electric machine body proper 10 is provided with a rotary rectifier 14 and an AC exciter 16. An AC output generated in the rotor of the exciter 16, with the rotation of the shaft 12, is converted into a DC output by means of the rotary rectifier 14. The DC output is supplied to a field winding 18 of the body proper 10 for exciting the field winding 18.

The rotary rectifier 14 is provided with a cylindrical ring 20 coaxially fitted around the rotating shaft 12, a cooler 24 provided on the inner surface of the cylindrical ring 20 through an insulating member 22, and a rectifier element 26 fixed to the cooler 24. The rectifier element 26 is cooled as the result of heat exchange of the rectifier element 26 with cooling air when fins 28 provided on the side wall of the cooler 24 rotates with rotation of the shaft 12 to exchange heat of the fins 28 with cooling air.

Figure 2:
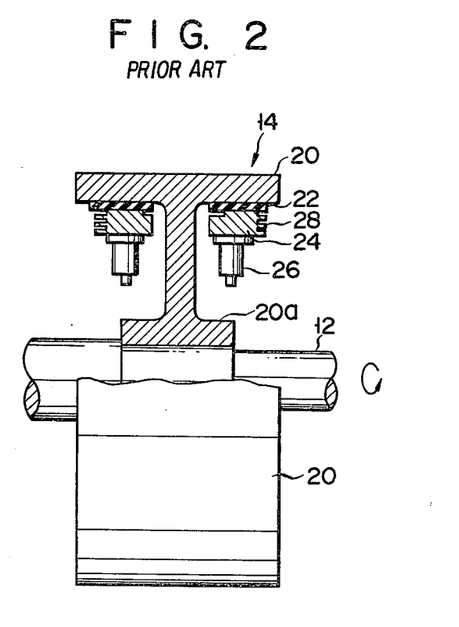
FIG. 2 is a sectional cut-away view of a rectifier used in the machine of FIG. 1.

As shown in FIG. 2 the rotary rectifier 14 is provided with the rectifier element 26 fixed to the cylindrical ring 20 through the insulating member 22 and the cooler 24, the ring 20 being fitted to the rotating shaft 12. Therefore, the rectifier element 26 must be mounted at the outer periphery of a fitting ring 20a of the cylindrical ring 20 for fitting the cylindrical ring 20 to the rotating shaft 12, isolated from the fitting ring 20a. The mounting position of the rectifier element 26 depends on the diameter of the rotating shaft 12 and the fitting portion 20a. Accordingly, it must be located at the far radially outer side in the rotary machine. With this structure, the centrifugal force developed when the rotating shaft 12 rotates at the speed of 3,600 rpm or more is very high. The centrifugal force applied to the rectifier elements 26 exceeds the limit of the withstanding strength. The result is insufficient and unstable rectification. Thus, it becomes impossible to operate the brushless rotary machine at ultra high speed.

The mounting position of the cooler 24 for cooling the rectifier element 26 is at the radially outer side location in the machine. When it rotates at high speed, friction heat with air becomes high since it contacts the air at a high speed. This lessens the cooling effect. Therefore, for keeping the temperature generated from the rectifier element 26 below a limit, the current capacity of the rectifier element 26 must be reduced.

As described above, the conventional rotary rectifier has problems in mechanical strength and cooling function arising from the mounting position of the rectifier elements. The problems are very serious since the rectifier element is a semiconductor device which is mechanically fragile and sensitive to ambient temperature.

SUMMARY OF THE INVENTION

The present invention is contrived in the above-mentioned circumstances, and an object of the present invention is to provide a brushless rotary machine which is adaptable for a high speed rotary machine.

DETAILED DESCRIPTION OF THE PREFERRED EMBODIMENTS

Figure 4:
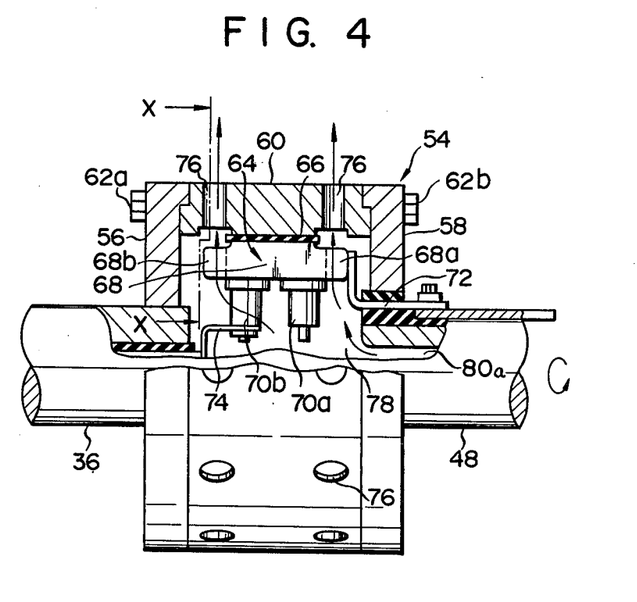
FIG. 4 is a sectional cut-away view of a rectifier unit used in the machine of FIG. 4.
Figure 5:
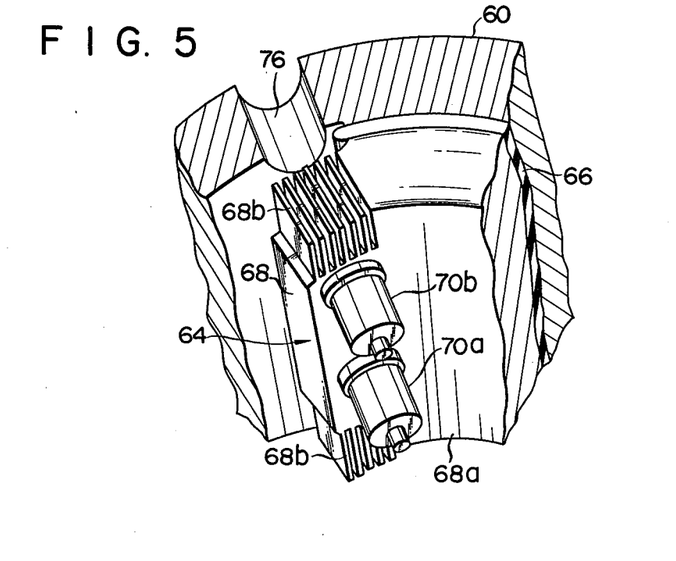
FIG. 5 is a perspective view showing a cross section taken along line V—V in FIG. 4.

A first embodiment of a brushless rotary machine according to the present invention will be described in detail referring to the accompanying drawings, particularly FIGS. 3 through 5.

Figure 3:
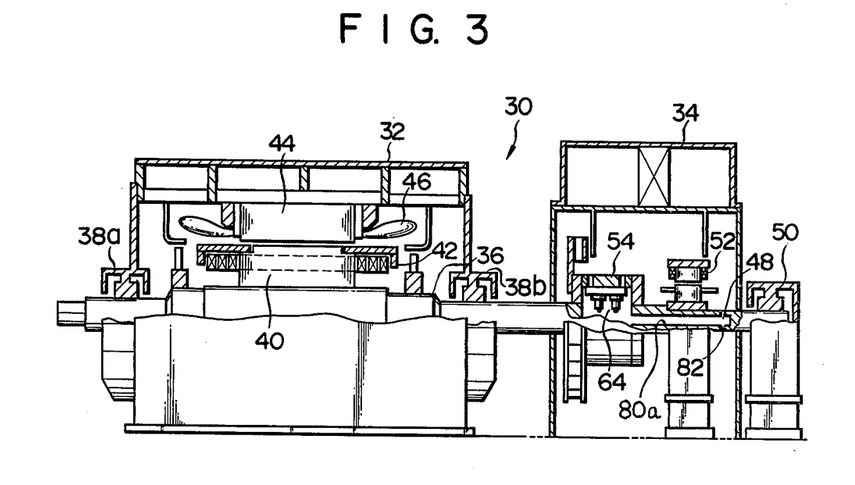
FIG. 3 is a longitudinal sectional view schematically showing a first embodiment of a brushless rotary machine according to the present invention.

As shown in FIG. 3, a brushless motor 30 as a brushless rotary machine is provided with a first housing 32 and a second housing 34, side by side.

A first shaft 36 is rotatably provided in the first housing 32, horizontally passing through the first housing 32. The first shaft 36 is rotatably supported by bearings 38a and 38b mounted at both sides of the first housing 32. A rotary iron core 40 is fixed around and coaxially with the outer periphery of the first shaft 36. The rotary iron core 40 is formed by laminating a number of thin iron-plates shaped like a doughnut. A plurality of slits (not shown) are axially formed on the outer peripheral surface of the rotary iron core 40. A cylindrical rotary coil 42 is fitted in each slit of the rotary iron core 40. The rotary coil 42 is not only of a cylindrical type, but also of a salient pole type. A stator iron core 44 is fixed to the inner peripheral surface of the first housing 32 facing the outer peripheral surface of the rotary iron core 40. The stator iron core 44 is formed by laminating a number of thin iron plates shaped like a doughnut. The inner peripheral surface of the stator iron core 44 and the outer peripheral surface of the rotary iron core 40 are separated from each other with a slight gap. A plurality of slits (not shown) are axially formed on the inner peripheral surface of the stator iron core 44. A stator coil 46 is fitted into each slit of the stator iron core 44. In FIG. 3, only the coil ends of the rotary coil 42 and the stator coil 46 are illustrated.

A second shaft 48 is rotatably mounted in the second housing 34, horizontally projecting outward. One end of the second shaft 48 is rotatably supported by a bearing unit 50, while the other end is positioned in the second housing 34. One end of the first shaft 36 passes through one side wall of the second housing 34 and is located in the second housing 34. The first shaft 36 and the second shaft 48 are coaxially aligned with each other, while spaced one from another. An AC exciter 52 is provided at the substantial center of the second shaft 48. The AC exciter 52 generates an alternate current with the rotation of the second shaft 48.

One end of the first shaft 36 and the other end of the second shaft 48 are coupled with each other by a coupling unit 54 so as to rotate together. The coupling unit 54, as shown in FIG. 4, is provided with a first flange 56 fixed to the outer periphery of one end of the first shaft 36, a second flange 58 fixed to the outer periphery of the other end of the second shaft 48, and a tubular member 60 coupling the first flange 56 with the second flange 58. The outer peripheral surfaces of both the first and second flanges 56 and 58 are flush with the outer peripheral surface of the tubular member 60. The first flange 56 and the tubular member 60 are fixed by bolts 62a and the second flange 58 and the tubular member 60 are fixed by bolts 62b. In the first embodiment, the coupling unit 54 is rigidly mounted.

A plurality of rectifiers 64 are equidistantly mounted on the inner peripheral surface of the tubular member 60 in a circumferential direction through respective insulating plates 66.

Each of rectifiers 64 is provided with a cooler 68 mounted to the inner peripheral surface of the insulating plate 66 and a pair of rectifier element 70a and 70b mounted on the inner surface of the cooler 68. Each cooler 68 is made of material with electrical conductivity and a good heat transfer coefficient. The cooler 68 includes a main frame 68a with an outer peripheral surface mounted to the insulating plate 66, and a plurality of fins 68b disposed on both sides of the main frame 68a. The pair of rectifier elements 70a and 70b are fixed on the inner surface of the main frame 68a, while being conductively coupled with each other. With such a structure, the rectifier elements 70a and 70b may be located substantially at the center of the first and second shafts 36 and 48 as viewed radially.

An AC input terminal of the rectifier element 70a, as one of the paired ones, of each rectifiers 64 is connected to the AC exciter 52 through a lead wire 72. The DC output terminal of the other rectifier element 70b is connected through the other lead wire 74 to the corresponding rotary coil 42. These rectifier elements 70a and 70b rectify an AC current coming through the lead wire 72 from the AC exciter 52 into a DC current, and output through the lead wire 74 to the rotary coil 42.

The tubular member 60 is provided on the outer peripheral surface with a plurality of cooling through-holes 76 radially passing through the tubular member 60. A space 78, surrounded by both first flanges 56 and 58 and the tubular member 60 for accommodating the rectifiers 64, communicates with the outside through the through-holes 76. A center hole 80a is axially formed at the center of the second shaft 48. One end of the center hole 80a is open to the space 78 and the other end communicates with the outside through a communicating hole 82 (FIG. 3). Accordingly, heat radiated through the rectifying operation of the rectifier elements 70a and 70b, is effectively dissipated into the space 78, through the body 68a of the cooler 68. The heat in the space 78 is led to the exterior through the holes 82, 80a and 76. Therefore, these rectifier elements 70a and 70b are prevented from being heated when these are operated.

The brushless motor 30 thus arranged is provided with a pair of the shafts 36 and 48. The rectifiers 64 is disposed at the coupling portion of the separate shafts 36 and 48. The rotating shaft portion is not existed in the coupling portion and these rectifying elements may be provided without allowing for the locations of the rotating shaft 12 and the cylindrical ring 20. In this way, the mounting position of the rectifier elements 70a and 70b may be set at the satisfactory inner portion as viewed radially, and the cooler 68 to which the rectifier elements 70a and 70b are fixed may be set at the inner portion. Therefore, the centrifugal force applied to the rectifier elements 70a and 70b may be reduced. Therefore, high speed machines of 7,200 rpm, for examples, may be designed within the range of the mechanical strength of the rectifier elements 70a and 70b against the centrifugal force applied. Further, the fan 68b of the cooler 68 is located at the far inner side. It is possible, therefore, to limit the friction heat with cooling air at a high speed rotation, thereby to effectively cool the rectifier elements 70a and 70b. In this case, the rectifier elements 70a and 70b are cooled by fanning the cooling air flowing through the holes 76 formed in the tubular member 60, the air flow being caused when the shafts 36 and 48 rotate. This cooling is effectively performed since the cooling air supplied from the holes 80 and 82 provided in the shaft 48 closer to the AC exciter 52 passes through the fin 68b of the cooler 68.

The brushless rotary machine described above is so designed that current, i.e. the power for exciting the coils, flows only in one direction. In other words, the AC exciter 52, rectifiers 64 and rotary coils 42 are arranged in one direction one after another. The shafts of the machine are thus shorter than otherwise. This is important particularly for a high-speed motor or a high-speed generator. The shorter the shaft is, the more mechanically strong it is. Another feature of the brushless rotary machine is that the first shaft 36 on which the rotary coils 42 are mounted, the second shaft 48 on which the AC exciter 52 is mounted and the rectifiers 64 are detachable. Each of these parts can thus be manufactured and tested independently of the other parts. For example, when the flange 56 of the first shaft 36 connected by a collector ring to an exciter unit, the first shaft 36 and the exciter unit form a motor and the first shaft 36 can be thus tested. Similarly, the rectifiers 64 and the AC exciter 52 can be put to test run. Further it is easy to overhaul the machine and to repair each part or replace it with a new one.

The rectifier elements 70a are made of semiconductor crystal, e.g. silicon crystal. Each rectifier element is so arranged as to be compressed by the centrifugal force. Hence, the rectifier elements 70a will less likely be broken than in case they are bent by the centrifugal force.

It should be understood that the invention is not limited to the above-mentioned embodiment, and may variously be changed and modified within the scope of the invention. Another embodiments of the present invention will be described. Like symbols are used for designating like or equivalent portions in the figures relating to the above-mentioned embodiment.

Figure 6:
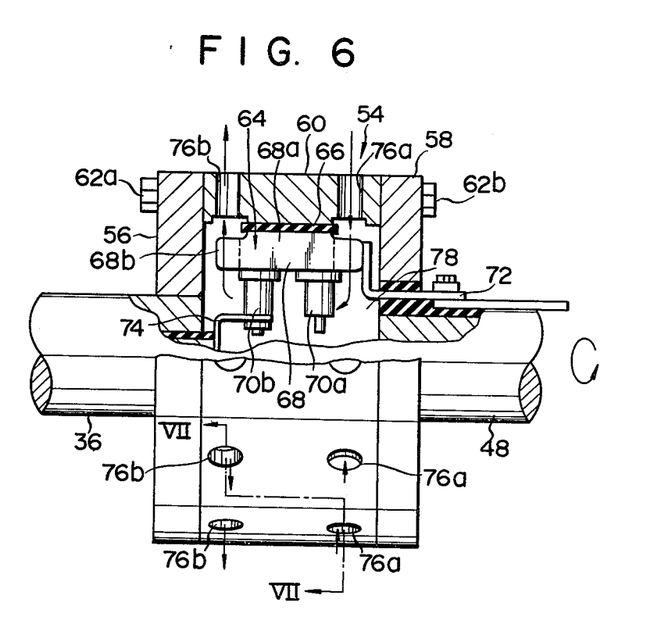
FIG. 6 is a sectional cut-away view showing a rectifier of a second embodiment according to the present invention.
Figure 7:
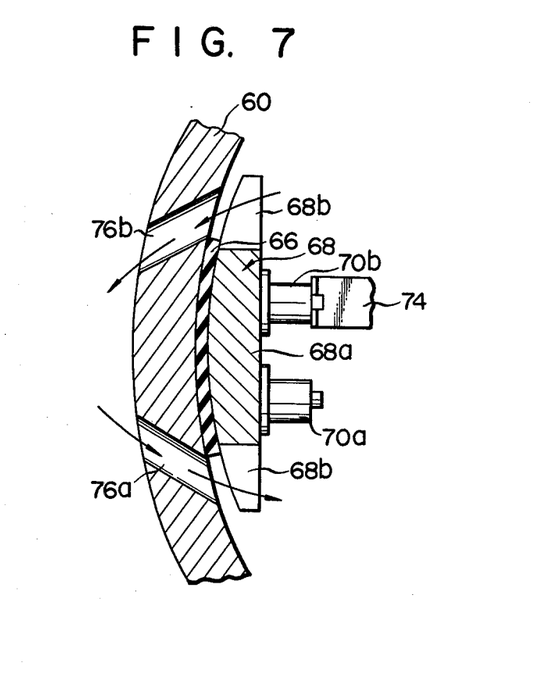
FIG. 7 is a cross sectional view taken along line VII—VII in FIG. 6.

A second embodiment of the invention will be described referring to FIGS. 6 and 7. In the first embodiment, the second shaft 48 is hollowed to have the center hole 80a. On the other hand, the second shaft 48 is not hollowed. Of the through-holes 76, the through-hole 76a corresponding to the rectifier element 70a slightly slants clockwise in the radial direction. The other through-hole 76b slightly slants counterclockwise in the radial direction. With this structure, when the shafts 36 and 48 rotate, external air is led to the space 78 through the through-hole 76a and the heated air in the space 78 is taken out to the exterior through the through-hole 76b. The through-hole 76a serves as an intake hole and the other through-hole 76b serves as an exit hole.

As described above, according to the second embodiment of the present invention, the rectifier elements 70a and 70b may be located at the satisfactory inner side, thereby allowing the brushless motor 30 to rotate at a very high speed. In the second embodiment, slanted holes 76a and 76b are used for the hole 76. Because of this feature, the air heated by the rectifier elements 70a and 70b in the space 78 may forcibly be ventilated, thereby effectively cooling the rectifier elements 70a and 70b.

Figure 8:
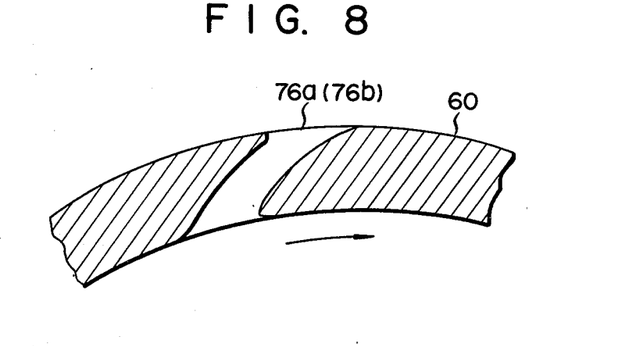
FIG. 8 is a cross sectional view showing one modification of a tubular member used in the second embodiment.

A modification of the second embodiment is illustrated in FIG. 8, in which the through-holes 76a and 76b are defined by a smoothly curved peripheral wall. Further, the inlet and outlet may smoothly be formed so as to have less resistance from a standpoint of fluid dynamics. If the through-holes 76a and 76b are so formed, an amount of flowing air increases and the cooling effect of the rectifier elements 70a and 70b is further improved.

Figure 9:
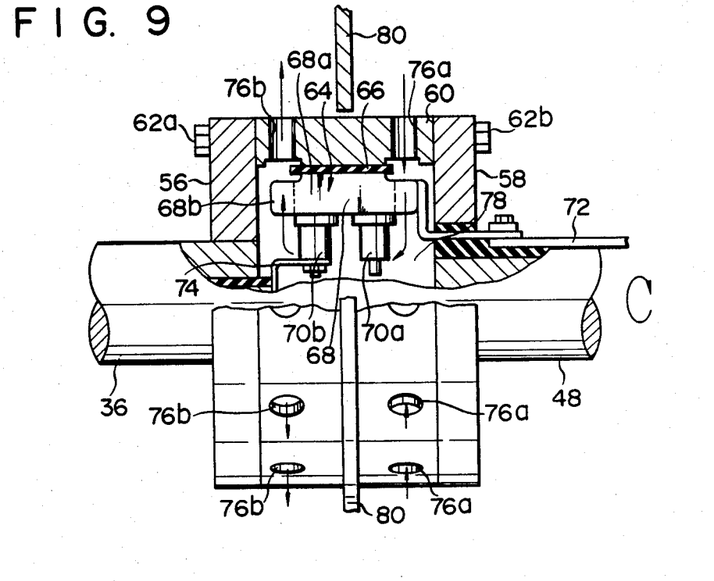
FIG. 9 is a sectional cut-away view showing the other modification of the rectifier of the second embodiment.

FIG. 9 shows another modification of the second embodiment of the invention. As shown, a partition wall 80 is provided close to and around the outer peripheral surface of the tubular member 60. The partition wall 80, located at central portion in the axial direction around the tubular member 60, divides an external space to which the through-hole 76a serving as an inlet hole opens from an external space to which the through-hole 76b serving as an oulet hole opens. With provision of the partition wall 80, there is no danger that the air exhausted from the space 78 through the through-hole 76benters through the through-hole 76a into the space 78. Therefore, the cooling operation is facilitated.

Figure 10:
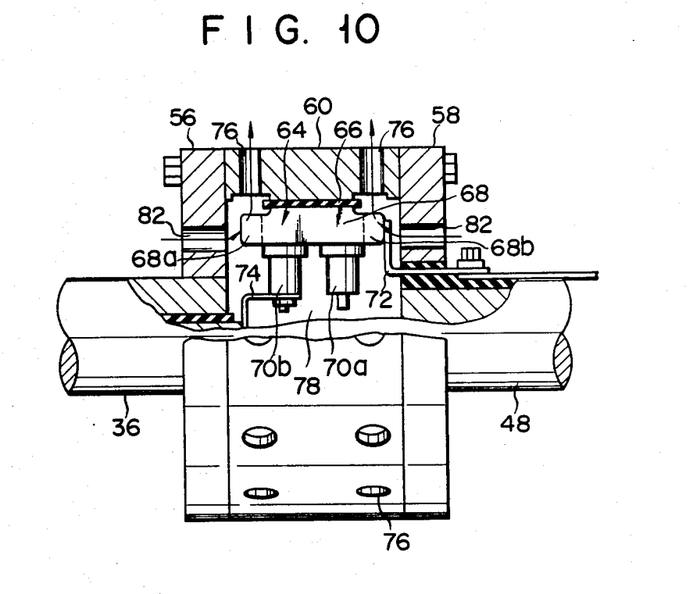
FIG. 10 is a sectional cut-away view showing a rectifier according to a third embodiment.

A third embodiment of the invention will be described referring to FIG. 10. In this embodiment, the through-holes 82 serving as intake holes are respectively formed in the first and second flanges 56 and 58 defining both side walls of the space 78. The third embodiment with the structure thus arranged may attain effects comparable with those of the second embodiment. In forming the through-hole 82, its working is done horizontally and therefore is much easier than when it is done on a curved surface.

Figure 11:
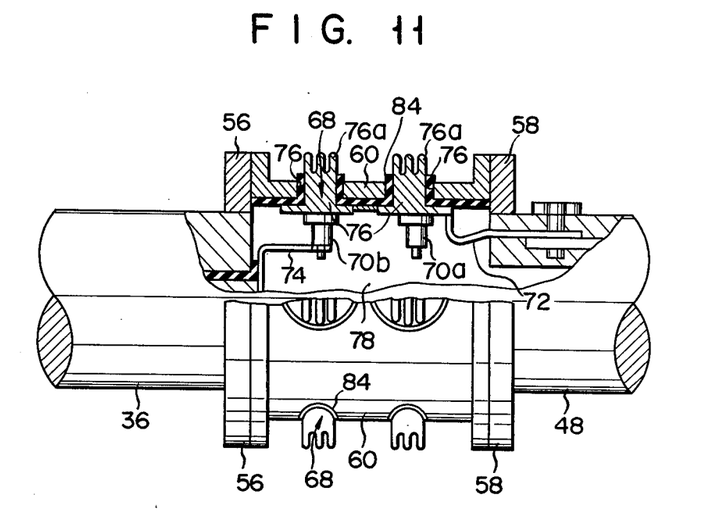
FIG. 11 is a sectional cut-away view showing a rectifier according to a fourth embodiment.

A fourth embodiment of the present invention will be described referring to FIG. 11. In the fourth embodiment, the through-holes 76 open and extend radially. The coolers 68 are inserted into the through-holes 76 through insulating sleeves 84, respectively. The inner end of a body 76a of the cooler 68 is positioned in the space 78, while its outer end projects outwardly from the through-hole 76. A fin 76b is formed integral with the outer surface of the body 76a, while projecting outwardly from the tubular member 60.

With such a structure of the fourth embodiment, the rectifier elements 70a and 70b are positioned at the far inner position of the rotary machine, allowing the brushless motor to rotate at high speed. According to the fourth embodiment, the fin 76a of the cooler 76 is exposed outside. Therefore, heat of the fin 76a is exchanged with external air and the space 78 is not heated, thereby eliminating the need for ventilation and cooling in the space 78. With such an arrangement, a structure for cooling the rectifier elements 70a and 70b is remarkably simplified.

Figure 12:
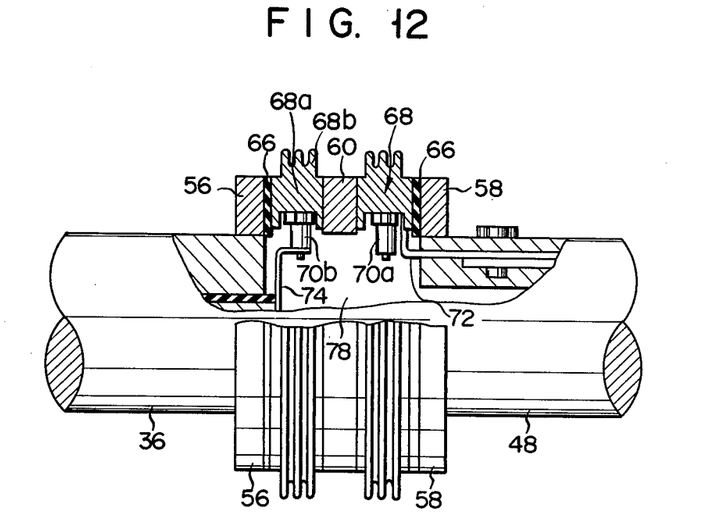
FIG. 12 is a sectional cut-away view showing a rectifier according to a fifth embodiment.

As shown in FIG. 12 illustrating a fifth embodiment of the invention, a pair of collers 68 are provided sandwiching the tubular member 60. The pair of coolers 68 are mounted to the first and second flanges 56 and 58, through an insulating ring 66. Each cooler 68 is provided with a ring like body 68a adjacent to the tubular member 60 and a fin 68b with a plurality of plates provided around the entire outer peripheral surface of the body 68a. The rectifier elements 70a and 70b are respectively mounted to the inner peripheral surfaces of the coolers 68.

The fifth embodiment thus constructed attains effects comparable with those of the fourth embodiment. A torque transfer between the first and second shafts 36 and 48 is performed through the body 68a of the cooler 68 and the insulating ring 66. Accordingly, the brushless motor 30 is further lightened.

The present invention may further be modified or changed. For example, the present invention, which has been applied for the brushless motor, may be applied to brushless generator.

What we claim is:
1. A brushless rotary machine comprising:
a first housing;
a first shaft rotatably supported in the first housing;
a rotor fixed to said first shaft and rotated with the rotation of said first shaft and magnetized when said rotor is supplied with DC current;
a stator disposed around said rotor and fixed to said first housing;
a second housing;
a second shaft provided coaxial with said first shaft, with a space between lhe first and second shafts and rotatably supported in said second housing;
AC generating means mounted on said second shaft, for generating AC current upon rotation of said second shaft;
coupling means for coupling said first and second shafts to rotate said shafts together; and
rectifying means provided in a space, said including a plurality of rectifying elements and cooling means for radiating heat of said rectifying elements outwardly provided in a space located in said coupling means between said first and second shafts, said rectifying means being electrically coupled with said AC generating means and said rotor, for rectifying AC current generated by said AC generating means into DC current and supplying the DC current to said rotor, thereby magnetizing said rotor.

2. The brushless rotary machine according to claim 1, wherein said coupling means includes a first flange rotating about a given rotating center together with said first shaft, a second flange provided opposite to said first flange and rotating about a rotating center coincident with that of said first flange together with said second shaft and a tubular member for rigidly coupling said first and second flanges, said space being defined by said first and second flange, and said tubular member.

3. The brushless rotary machine according to claim 1 or 2, wherein said rectifying elements are mounted on the inner surface of said tubular member through said cooling means.

4. The brushless rotary machine according to claim 3, wherein said cooling means includes a body with said rectifying elements mounted thereto, a plurality of fins mounted to said body, and communicating means for communicating said space with exterior.

5. The brushless rotary machine according to claim 4, wherein said communicating means includes a plurality of through-holes formed in said tubular member.

6. The brushless rotary machine according to claim 4, wherein said through-holes pass through the peripheral wall of said tubular member, extending in the radial direction of said tubular member, said communicating means being axially formed in said second shaft, and including a hole opening at one end to said space and a communicating hole to allow the other end to open to exterior.

7. The brushless rotary machine according to claim 5, wherein said through-hole includes a first group of through-holes slightly slanted clockwise at a given angle with respect to the radial direction of said tubular member and a second group of through-holes slightly slanted counterclockwise at a given angle.

8. The brushless rotary machine according to claim 4, wherein said communicating means includes a plurality of through-holes formed in said tubular member and a plurality of through-holes formed in said first and second flanges.

9. The brushless rotary machine according to claim 3, wherein said tubular member has a plurality of through-holes passing therethrough, and said cooling means includes a body portion which has the inner surface passing through each of said through-holes and on which said corresponding rectifier element and an outer surface exposing outside, and a fin with a plurality of plates provided outside the outer surface of said body and projecting outwardly through said through-hole.

10. The brushless rotary machine according to claim 3, wherein said cooling means includes a pair of ring like bodies provided adjacent to said tubular member and fins provided on the outer peripheral surface of said bodies and projecting outwardly.

11. The brushless rotary machine according to claim 10, wherein both said bodies are connected to said first and second flanges through insulating members.

* * * * *